March 2, 1943. B. ULINSKI 2,312,942
POWER STEER SWITCH
Filed July 23, 1940
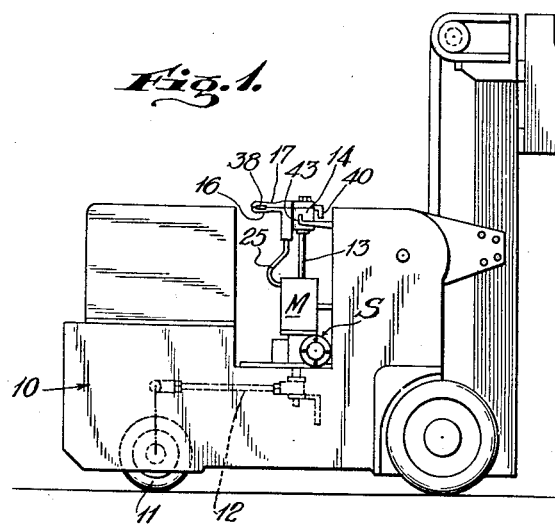
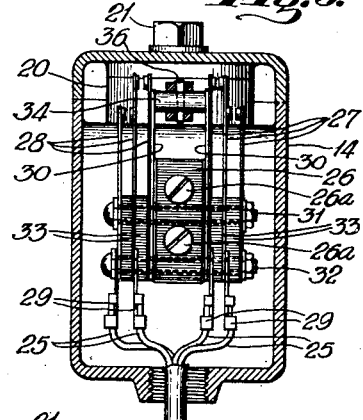
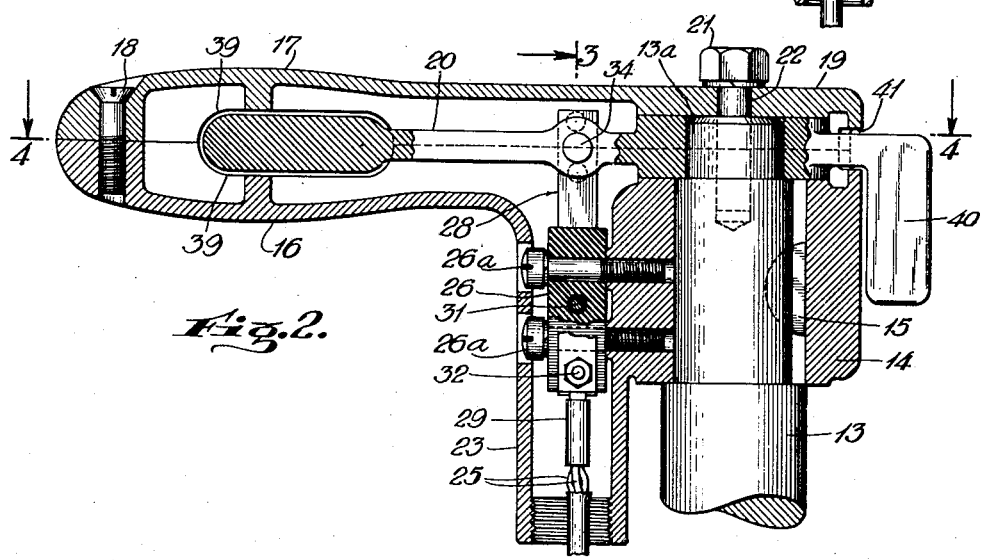
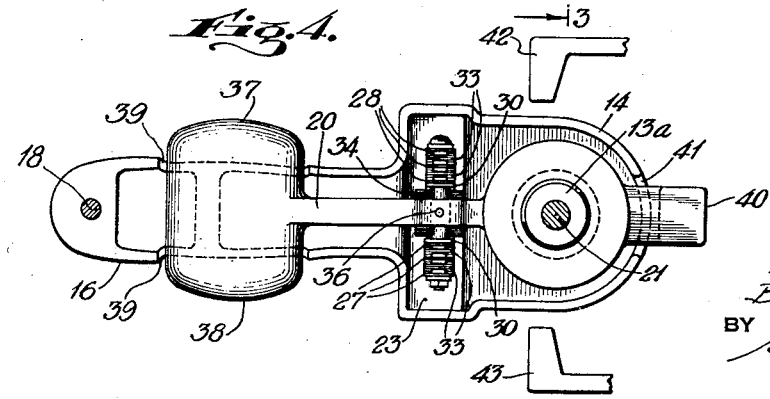
INVENTOR
B. Ulinski
BY
A. H. Golden
ATTORNEY Patented Mar. 2, 1943

2,312,942

UNITED STATES PATENT OFFICE 2,312,942

POWER STEER SWITCH

Bronislaus Ulinski, Chicago, Ill., assignor to The Yale & Towne Manufacturing Company, Stamford, Conn., a corporation of Connecticut Application July 23, 1940, Serial No. 346,935

19 Claims. (Cl. 180—79.1)

This invention relates to a control device for power steering apparatus, and more particularly, power steering apparatus of the type utilized in industrial trucks.

More particularly, my invention relates to a switch mechanism for the steering motor of an industrial truck so constructed that the wheel positions of the truck will be apparent to the operator during his manipulation of the switch. My invention relates further to circuit closing means for a steering motor readily manipulated in any direction in any steering position, and which are so mounted that the jouncing of the truck incidental to the rough usage for which industrial trucks are adapted, will not in any way hinder the operation of the switching mechanism.

In my invention, I utilize steering apparatus including an electric operating motor, and a shaft rotatable with the apparatus preferably in direct relation to the steering wheels. I mount on this shaft a switch assembly for controlling the steering circuits of the said electric motor, this switch assembly being preferably in the form of a handle rotatable with the steering shaft, whereby the position of the handle is always indicative of the steering position of the wheels. As a feature of my invention, there is supported relatively to this handle a single circuit closing means for the electric operating motor, which is movable relatively to the handle for closing one or the other of two directional circuits of the steering motor depending on the direction of movement of said means. It will be appreciated that because the handle is mounted on the rotatable steering shaft, it furnishes a firm base for the movement relatively thereto of the circuit closing means in all positions of the steering handle, and by that hand of the operator which follows the movement of the steering handle.

More in detail, this circuit closing means may take the form of a lever which is preferably pivotally associated relatively to the handle, and preferably is mounted within the handle for movement relatively thereto. As a further feature of my invention, the lever has portions thereof protruding through opposed slots formed in the handle, whereby manual pressure may be applied to the lever to move it relatively to the handle for closing one or the other of the two directional circuits of the steering motor.

As still a further feature of my invention, I arrange for a limit means to engage the circuit closing lever in one or the other of the two extreme rotated positions of the shaft and handle, for moving the lever relatively to the handle to open the then closed steering circuit.

Still a further feature of the invention is the arrangement of the circuit closing lever whereby should the limit means fail in their first operation of the lever to open the directional circuit, the lever will be forced into a position to close the opposite directional circuit, therey reversing the steering apparatus, all as will be fully appreciated by those skilled in the art.

I have thus described generally the more important features of my invention in order that its operation may be understood. In the description of the construction of my invention which follows, further additional important patentable features will be described and later claimed. I should like to indicate further that while I shall show and describe the particular form of my invention which I prefer, those skilled in the art will understand that my basic contribution to the art may be readily utilized in many other mechanical forms.

Referring now to the drawing wherein is shown one form of my invention, Fig. 1 is an outline view of a typical industrial truck in which my invention is shown installed. Fig. 2 is a vertical section through my steering switch assembly. Fig. 3 is a view substantially along lines 3—3 of Fig. 2, while Fig. 4 is a sectional view taken substantially along lines 4—4 of Fig. 2.

Referring now more particularly to the drawing, reference numeral 10 in Fig. 1 designates generally a typical industrial truck in which the steering wheels 11 are adapted for steering movement imparted by a rod 12 actuated by a power steering apparatus, designated generally by the reference latter S. This power steering apparatus is powered by an electric motor M, and includes a driven shaft 13 which is rotated as wheels 11 are steered, and preferably in direct ratio to the steering rotation of the wheels 11 in order that the shaft may be indicative of the steering position of the wheels.

I shall not show and describe the particular means whereby the steering apparatus S steers the wheels 11 and drives the shaft 13, because such means are old and well known in the art and form no part of my invention. Similarly, the particular electric circuits of the motor M which are closed by the operation of my switch, will not be described since they also are of a type well known in the art and are not part of my invention.

The steering switch assembly is preferably in the form of a handle grip extending from a main casing, as best seen in Figs. 1 and 2. Both the handle grip and the main casing are formed by the assembly of top and bottom portions. Thus, the main casing includes a bottom portion 14, which is keyed through the key 15 to the steering shaft 13, as is best seen in Fig. 2. The bottom half of the handle grip is integral with portion 14 and is designated by reference numeral 16. The upper half of the handle grip is designated by reference numeral 17, and forms with the lower half 16 a hollow handle grip, the two parts being held together at one end by a screw 18, as is quite apparent from Fig. 2.

The upper half 17 of the handle grip extends horizontally as at 19 to form the upper half of the main casing. A switch operating lever 20 lies partly within the hollow handle grip and partly within the main casing, and is mounted on the upper end 13a of the shaft 13 for pivotal movement relatively to the shaft and the handle grip and casing. A bolt 21 passes down through a bored opening 22 in the upper half 19 of the main casing and into the end portion 13a of shaft 13, whereby to hold the entire handle assembly and the switch lever 20 against movement off the shaft 13.

Between the bottom half 14 of the main casing, and the bottom half 16 of the handle grip, there is a downwardly depending casing portion 23 into which are inserted the conducting wires 25 which run from the steering motor M. A contact supporting block 26 of insulating material is secured through bolts 26a to the casing portion 14, as is apparent from Fig. 2. On this insulation block 26 there are supported two series of spring contact fingers. The series 27 is at one side of the switch operating lever 20, as is best seen from Figs. 3 and 4, and the series 28 is at the other side of the switch operating lever 20. Through suitable connecting members 29, contact is made between the wires 25 and the spring contact fingers of series 27 and 28, all as will be understood by those skilled in the art.

At each side of the block 26 and in juxtaposed relation to the first of the spring contact fingers of the series 27 and 28, is a relatively stiff leaf spring 30. The springs 30 cooperate with the lever 20, as will be better indicated later, to maintain that lever in a central position relatively to the handle assembly, and in a neutral position relatively to the contact fingers. It may be well to indicate that the relatively stiff springs 30, the series of contact fingers 27 and 28, and insulation members 33 between the contact fingers, are all secured relatively to the contact block 26 by bolts 31 and 32 in a manner well understood in this art.

The switch operating lever 20 carries thereon a switch operating pin 34 of insulating material which is mounted in a bore 35 of the lever, and is maintained in position by a suitable pin 36, which may be a cotter pin, if desired. The lever 20 has formed thereon also, lateral abutments 37 and 38, which protrude through slots 39 formed between the two halves 16 and 17 of the handle grip. It may be well to indicate also that the switch lever 20 has a lug 40 extending outwardly of the main casing through an opening 41 formed therein between the portions 14 and 19, it being the function of the lug 40 to cooperate with limit lugs 42 and 43 mounted on the frame of the truck, all as will be described presently.

It will now be appreciated that the operator of the truck has only to move the switch operating lever 20 to the right or left relatively to the switch handle assembly to close the steering circuits for the steering motor M through either of the series of contacts 27 and 28. Naturally, this action takes place through the medium of pin 34 and is resisted by one or the other of leaf springs 30.

When a steering circuit is closed through one of the series of contacts, the motor M will operate in one direction, whereas when the circuit is closed through the other of the series of contacts, the steering motor will operate in a reverse direction.

The relatively stiff springs 30 tend to maintain the switch lever in its neutral or central position, shown best in Fig. 4, so that it requires a continuous pressure on the lever 20 to maintain it in one of its circuit closing positions Once the circiut through the steering motor M is closed, the steering apparatus will rotate the steering wheels 11 and the steering shaft 13, moving the handle assembly with the steering apparatus. The operator has but to observe the position of the handle assembly and the handle grip, to know at all times the positions of the steering wheels 11. He can readily, by releasing either of the abutments 37 or 38 of the switch lever 20, open the steering motor circuit so that the steering wheels will be maintained in the particular position in which they have been positioned. The operator can readily reverse the direction of steering by simply reversing the position of the lever 20.

In order to limit the rotation of the steering wheels by the steering apparatus S, the lug 40 of the switch lever 20 is utilized. It will be readily appreciated that when the steering handle and lever 20 are rotated to one or the other of the extreme steering positions, lug 40 will abut one or the other of the two fixed limit lugs 42, 43. Regardless of which of the lugs is contacted, the switch lever 20 will, through its lug 40, be moved away from its then circuit closing position, and into the central neutral position of Fig. 4. If the particular directional steering circuit remains closed through mischance, a further rotation of the handle assembly and the switch lever 20 will through one or the other of the lugs 42, 43 force the lever 20 beyond its neutral position and into a position to close the circuit of the steering motor in a reverse direction, all as will be appreciated by those skilled in the art.

It will now be understood that through the utilization of my assembly, I obtain a readily operable steering switch assembly which is capable at all times of indicating the position of the steering wheels of the truck; which is readily operable and reversible by the operator relatively to a firm base in all steering positions, and by that hand of the operator which is used to follow the steering movement. It will be further understood that through the utilization of my invention, I can employ relatively simple limit means which may function not only to open a particular directional steering circuit, but to reverse the direction of steering.

I now claim:

1. In a combination of the class described, a handle grip, a manually operated switch lever mounted in juxtaposed relation to said handle grip and adapted for manual movement relatively to said handle grip by the application of manual pressure against said switch lever, means whereby a directional steering circuit is closed by the movement of said switch lever in one direction relatively to said handle grip, and means whereby an opposite directional steering circuit is closed by the movement of said switch lever in an opposite direction relatively to said handle grip.

2. In a combination of the class described, a rotatable handle grip, a freely rotatable switch lever mounted in juxtaposed relation to said handle grip and adapted for manual movement relatively to said handle grip, spring means maintaining said lever centrally relatively to said handle grip and opposing manual movement of said switch lever relatively to said handle grip, means whereby a directional steering circuit is closed by movement of said switch lever against the pressure of said spring means in one direction relatively to said handle grip, and means whereby an opposite directional steering circuit is closed by the movement of said switch lever in an opposite direction relatively to said handle grip.

3. In a combination of the class described, a rotatable handle grip, a freely rotatable switch lever mounted for rotation with said handle grip and adapted for limited manual movement relatively to said handle grip, means whereby a directional steering circuit is closed by the manual movement of said switch lever in one direction relatively to said handle grip, means whereby an opposite directional steering circuit is closed by the movement of said switch lever in an opposite direction relatively to said handle grip, a steering apparatus, a steering motor for rotating said apparatus in one or the other direction, dependent on the particular directional steering circuit closed, and means for rotating said handle grip and therefore said switch lever with said steering apparatus.

4. In a combination of the class described, a handle grip, a switch lever mounted for limited manual movement relatively to said handle grip and for movement with said handle grip, spring means pressing said lever centrally relatively to said handle grip and opposing said limited manual movement relatively to said handle grip, means whereby a directional steering circuit is closed by the manual movement of said switch lever against the pressure of said spring means in one direction relatively to said handle grip, means whereby an opposite directional steering circuit is closed by the manual movement of said switch lever in an opposite direction relatively to said handle grip, a steering apparatus, a steering motor for rotating said apparatus in one or the other direction, dependent on the particular directional steering circuit closed, and means for rotating said handle grip with said apparatus.

5. In a combination of the class described, a handle grip, a switch lever mounted for movement relatively to said handle grip, means whereby a directional steering circuit is closed by the movement of said switch lever in one direction relatively to said handle grip, means whereby an opposite directional steering circuit is closed by the movement of said switch lever in an opposite direction relatively to said handle grip, a steering apparatus, a steering motor for rotating said apparatus in one or the other direction, dependent on the particular directional steering circuit closed, means for rotating said handle grip with said apparatus, and limit means for moving said switch lever relatively to said handle grip into position to open the particular directional circuit then closed when said handle grip is rotated with said steering apparatus into an extreme directional position.

6. In a combination of the class described, a handle grip, a switch lever mounted for movement relatively to said handle grip, means whereby a directional steering circuit is closed by the movement of said switch lever in one direction relatively to said handle grip, means whereby an opposite directional steering circuit is closed by the movement of said switch lever in an opposite direction relatively to said handle grip, a steering apparatus, a steering motor for rotating said apparatus in one or the other direction, dependent on the particular directional steering circuit closed, means for rotating said handle grip with said apparatus, and limit means for moving said switch lever relatively to said handle grip into position to open the particular directional circuit then closed when said handle grip is rotated with said steering apparatus into an extreme directional position, the further movement of said handle grip with said steering apparatus in the event said circuit fails to open, bringing said limit means into coaction with said switch lever to close the reverse directional circuit.

7. In a combination of the class described, a rotatable handle, manually operated circuit closing means carried by said handle and mounted for manual movement relatively to said handle and for rotation with said handle, means whereby a directional steering circuit is closed by one particular movement of said circuit closing means relatively to said handle, means whereby an opposite directional steering circuit is closed by another movement of said circuit closing means relatively to said handle, a steering apparatus, a steering motor for rotating said apparatus in one or the other direction, dependent on the particular directional steering circuit closed, and means for rotating said handle with said apparatus.

8. In a combination of the class described, a handle, circuit closing means carried by said handle and mounted for movement relatively to said handle, means whereby a directional steering circuit is closed by one particular operation of said circuit closing means, means whereby an opposite directional steering circuit is closed by another operation of said circuit closing means, a steering apparatus, a steering motor for rotating said apparatus in one or the other direction, dependent on the particular directional steering circuit closed, means for rotating said handle with said apparatus, and limit means for moving said circuit closing means relatively to said handle into position to open the particular directional circuit then closed when said handle is rotated with said steering apparatus into an extreme directional position.

9. In a combination of the class described, a handle, circuit closing means carried by said handle and mounted for movement relatively to said handle, means whereby a directional steering circuit is closed by one particular operation of said circuit closing means, means whereby an opposite directional steering circuit is closed by another operation of said circuit closing means, a steering apparatus, a steering motor for rotating said apparatus in one or the other direction, dependent on the particular steering circuit closed, means for rotating said handle with said apparatus, and limit means for moving said circuit closing means relatively to said handle into position to open the particular directional circuit then closed when said handle is rotated with said steering apparatus into an extreme directional position, the further movement of said handle with said steering apparatus in the event said circuit fails to open, bringing said limit means into coaction with said circuit closing means to close the reverse directional circuit.

10. In a combination of the class described, a substantially hollow handle grip having a slot at each side thereof, a switch member within said hollow handle grip mounted for pivotal movement relatively thereto, spring means maintaining said switch member in a central balanced position, and portions of said member accessible through said slots in the handle grip whereby it may be moved in opposite directions from said central balanced position relatively to said handle grip.

11. In a combination of the class described, a substantially hollow handle grip having a slot at each side thereof, a switch lever within said hollow handle grip mounted for pivotal movement relatively thereto and having portions accessible through said slots in the handle grip whereby it may be moved in opposite directions relatively to said handle grip, means whereby a directional steering circuit is closed by the movement of said switch lever in one direction relatively to said handle grip, and means whereby an opposite directional steering circuit is closed by the movement of said switch lever in an opposite direction relatively to said handle grip.

12. In a combination of the class described, a substantially hollow handle grip having a slot at each side thereof, a switch lever within said hollow handle grip mounted for pivotal movement relatively thereto and having portions accessible through said slots in the handle grip whereby it may be moved in opposite directions relatively to said handle grip, means whereby a directional steering circuit is closed by the movement of said switch lever in one direction relatively to said handle grip, means whereby an opposite directional steering circuit is closed by the pivotal movement of said switch lever in an opposite direction relatively to said handle grip, a steering apparatus including a shaft rotatable therewith, a steering motor for rotating said apparatus and shaft in one or the other direction, dependent on the particular directional steering circuit closed, and means mounting said handle grip for rotation with said shaft.

13. In a combination of the class described, a substantially hollow handle grip having a slot at each side thereof, a switch lever within said hollow handle grip mounted for pivotal movement relatively thereto and having portions accessible through said slots in the handle grip whereby it may be moved in opposite directions relatively to said handle grip, means whereby a directional steering circuit is closed by the movement of said switch lever in one direction relatively to said handle grip, means whereby an opposite directional steering circuit is closed by the pivotal movement of said switch lever in an opposite direction relatively to said handle grip, a steering apparatus including a shaft rotatable therewith, a steering motor for rotating said apparatus and shaft in one or the other direction, dependent on the particular directional steering circuit closed, means mounting said handle grip for rotation with said shaft, a portion of said switch lever extending outwardly of said handle, and stop means located relatively to said shaft and handle grip in positions corresponding to extreme and opposite steering positions of said shaft and steering apparatus, one or the other of said stop means abutting the switch lever to move it relatively to the handle grip to open the particular directional circuit then closed when said handle grip is rotated with said steering shaft into an extreme directional position.

14. In a combination of the class described, a steering apparatus including a shaft rotatable therewith as said apparatus is operated in opposite steering directions, a steering motor for operating said steering apparatus, a handle grip fixed to said shaft for rotation therewith as said steering motor actuates said apparatus, a manually operated switch lever freely pivoted on said shaft and therefore pivotally movable relatively to said handle and said shaft while rotatable with said handle when the two are held manually for rotation together, means whereby a directional steering circuit for said motor is closed by pivotal movement of said switch lever in one direction relatively to said handle grip, and means whereby an opposite directional steering circuit is closed by the pivotal movement of said switch lever in an opposite direction relatively to said handle grip.

15. In a combination of the class described, a steering apparatus including a shaft rotatable therewith as said apparatus is operated in opposite steering directions, a steering motor for operating said steering apparatus, a handle grip secured to said shaft for integral rotation therewith, a switch lever pivoted on said shaft and therefore pivotally movable relatively to said handle while rotatable with said handle when the two are held manually for rotation together, means whereby a directional steering circuit for said motor is closed by pivotal movement of said switch lever in one direction relatively to said handle grip, means whereby an opposite directional steering circuit is closed by the pivotal movement of said switch lever in an opposite direction relatively to said handle grip, and limit means for moving said switch lever relatively to said handle grip into position to open the particular directional circuit then closed when said handle grip is rotated with said steering apparatus into an extreme directional position.

16. In a combination of the class described, a steering apparatus including a shaft rotatable therewith as said apparatus is operated in opposite steering directions, a steering motor for operating said steering apparatus, a substantially hollow handle grip having a slot at each side thereof secured to said shaft for integral rotation therewith, a switch lever within said handle grip mounted for pivotal movement relatively to said grip, said lever having portions accessible through said slots in the handle grip whereby it may be moved in opposite directions relatively to said handle grip, spring means between said switch lever and handle grip yieldingly maintaining said switch lever in a central neutral position relatively to said handle grip, means whereby a directional steering circuit for said motor is closed by pivotal movement of said switch lever in one direction relatively to said handle grip, and means whereby an opposite directional steering circuit is closed by the pivotal movement of said switch lever in an opposite direction relatively to said handle grip.

17. In a combination of the class described, a steering apparatus including a shaft rotatable therewith as said apparatus is operated in opposite steering directions, a steering motor for operating said steering apparatus, a substantially hollow handle grip having a slot at each side thereof secured to said shaft for integral rotation therewith, a switch lever within said handle grip mounted also on said shaft but for pivotal movement relatively to said shaft and grip, said lever having portions accessible through said slots in the handle grip whereby it may be moved in opposite directions relatively to said handle grip, spring means maintaining said switch lever substantially centrally of said hollow handle grip, means whereby a directional steering circuit for said motor is closed by pivotal movement of said switch lever against said spring means in one direction relatively to said handle grip, and means whereby an opposite directional steering circuit is closed by the pivotal movement of said switch lever against said spring means in an opposite direction relatively to said handle grip.

18. In a combination of the class described, a steering apparatus including a shaft rotatable therewith as said apparatus is operated in opposite steering directions, a steering motor for operating said steering apparatus, a substantially hollow handle grip having a slot at each side thereof secured to said shaft for integral rotation therewith, a switch lever within said handle grip mounted also on said shaft but for pivotal movement relatively to said shaft and grip, said lever having portions accessible through said slots in the handle grip whereby it may be moved in opposite directions relatively to said handle grip, means whereby a directional steering circuit for said motor is closed by pivotal movement of said switch lever in one direction relatively to said handle grip, means whereby an opposite directional steering circuit is closed by the pivotal movement of said switch lever in an opposite direction relatively to said handle grip, and limit means for moving said switch lever relatively to said handle grip into position to open the particular directional circuit then closed when said handle grip is rotated with said steering apparatus into an extreme directional position.

19. In a combination of the class described, a steering apparatus including a shaft rotatable therewith as said apparatus is operated in opposite steering directions, a steering motor for operating said steering apparatus, a hollow handle grip fixed to said shaft for rotation therewith as said steering motor actuates said apparatus, a switch lever rotatably mounted on said shaft and within said handle grip and rotatable with said handle when the two are held manually for rotation together, said handle grip having openings through which said lever is movable manually relatively to said handle grip, means whereby a directional steering circuit for said motor is closed by pivotal movement of said switch lever in one direction relatively to said handle grip, and means whereby an opposite directional steering circuit is closed by the pivotal movement of said switch lever in an opposite direction relatively to said handle grip.

BRONISLAUS ULINSKI.